US009784185B2

(12) United States Patent
Kolvick (10) Patent No.: US 9,784,185 B2
(45) Date of Patent: Oct. 10, 2017

(54) SYSTEM AND METHOD FOR COOLING A GAS TURBINE WITH AN EXHAUST GAS PROVIDED BY THE GAS TURBINE

(75) Inventor: Sandra Beverly Kolvick, Greenville, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 1104 days.

(21) Appl. No.: 13/456,575

(22) Filed: Apr. 26, 2012

(65) Prior Publication Data

US 2013/0283808 A1    Oct. 31, 2013

(51) Int. Cl.
F02C 7/18     (2006.01)
F02C 3/34     (2006.01)
F02C 7/141    (2006.01)

(52) U.S. Cl.
CPC ............... *F02C 7/18* (2013.01); *F02C 3/34* (2013.01); *F02C 7/141* (2013.01)

(58) Field of Classification Search
CPC .... F02C 3/34; F02C 7/141; F02C 3/04; F02C 1/08; F01K 23/08; F01K 23/10; Y02E 20/16; F02B 39/14
USPC .... 60/39.52, 605.3, 805, 806, 782, 785, 795
See application file for complete search history.

(56) References Cited

U.S. PATENT DOCUMENTS

| | | |
|---|---|---|
| 2,488,911 A | 11/1949 | Hepburn et al. |
| 2,884,758 A | 5/1959 | Oberle |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |

(Continued)

FOREIGN PATENT DOCUMENTS

| | | |
|---|---|---|
| CA | 2231749 | 9/1998 |
| CA | 2645450 | 9/2007 |

(Continued)

OTHER PUBLICATIONS

PCT Written Opinion of PCT/US2013/037466 mailed Aug. 1, 2013.
(Continued)

*Primary Examiner* — Craig Kim
(74) *Attorney, Agent, or Firm* — Fletcher Yoder P.C.

(57) ABSTRACT

A system for cooling a gas turbine with an exhaust gas provided by the gas turbine generally includes an exhaust gas recirculation system including an exhaust gas scrubber. The exhaust gas recirculation system is disposed downstream from the gas turbine and may receive at least a portion of the exhaust gas provided by the gas turbine. The system may also include a moisture separator located downstream from the exhaust gas recirculation system, and a cooling circuit configured to connect to one or more cooling circuit inlets. The one or more cooling circuit inlets may provide fluid communication between the cooling circuit and the gas turbine.

20 Claims, 2 Drawing Sheets

(56) References Cited

U.S. PATENT DOCUMENTS

| | | | |
|---|---|---|---|
| 4,092,095 | A | 5/1978 | Straitz, III |
| 4,101,294 | A | 7/1978 | Kimura |
| 4,112,676 | A | 9/1978 | DeCorso |
| 4,117,671 | A | 10/1978 | Neal et al. |
| 4,133,567 | A * | 1/1979 | McGann ............... F01K 23/064 290/40 R |
| 4,160,640 | A | 7/1979 | Maev et al. |
| 4,165,609 | A | 8/1979 | Rudolph |
| 4,171,349 | A | 10/1979 | Cucuiat et al. |
| 4,204,401 | A | 5/1980 | Earnest |
| 4,222,240 | A | 9/1980 | Castellano |
| 4,224,991 | A | 9/1980 | Sowa et al. |
| 4,236,378 | A | 12/1980 | Vogt |
| 4,253,301 | A | 3/1981 | Vogt |
| 4,271,664 | A | 6/1981 | Earnest |
| 4,344,486 | A | 8/1982 | Parrish |
| 4,345,426 | A | 8/1982 | Egnell et al. |
| 4,352,269 | A | 10/1982 | Dineen |
| 4,380,895 | A | 4/1983 | Adkins |
| 4,399,652 | A | 8/1983 | Cole et al. |
| 4,414,334 | A | 11/1983 | Hitzman |
| 4,434,613 | A | 3/1984 | Stahl |
| 4,435,153 | A | 3/1984 | Hashimoto et al. |
| 4,442,665 | A | 4/1984 | Fick et al. |
| 4,445,842 | A | 5/1984 | Syska |
| 4,479,484 | A | 10/1984 | Davis |
| 4,480,985 | A | 11/1984 | Davis |
| 4,488,865 | A | 12/1984 | Davis |
| 4,498,288 | A | 2/1985 | Vogt |
| 4,498,289 | A | 2/1985 | Osgerby |
| 4,528,811 | A | 7/1985 | Stahl |
| 4,543,784 | A | 10/1985 | Kirker |
| 4,548,034 | A | 10/1985 | Maguire |
| 4,561,245 | A | 12/1985 | Ball |
| 4,569,310 | A | 2/1986 | Davis |
| 4,577,462 | A | 3/1986 | Robertson |
| 4,602,614 | A | 7/1986 | Percival et al. |
| 4,606,721 | A | 8/1986 | Livingston |
| 4,613,299 | A | 9/1986 | Backheim |
| 4,637,792 | A | 1/1987 | Davis |
| 4,651,712 | A | 3/1987 | Davis |
| 4,653,278 | A | 3/1987 | Vinson et al. |
| 4,681,678 | A | 7/1987 | Leaseburge et al. |
| 4,684,465 | A | 8/1987 | Leaseburge et al. |
| 4,753,666 | A | 6/1988 | Pastor et al. |
| 4,762,543 | A | 8/1988 | Pantermuehl et al. |
| 4,817,387 | A | 4/1989 | Lashbrook |
| 4,858,428 | A | 8/1989 | Paul |
| 4,895,710 | A | 1/1990 | Hartmann et al. |
| 4,898,001 | A | 2/1990 | Kuroda et al. |
| 4,946,597 | A | 8/1990 | Sury |
| 4,976,100 | A | 12/1990 | Lee |
| 5,014,785 | A | 5/1991 | Puri et al. |
| 5,044,932 | A | 9/1991 | Martin et al. |
| 5,073,105 | A | 12/1991 | Martin et al. |
| 5,084,438 | A | 1/1992 | Matsubara et al. |
| 5,085,274 | A | 2/1992 | Puri et al. |
| 5,098,282 | A | 3/1992 | Schwartz et al. |
| 5,123,248 | A | 6/1992 | Monty et al. |
| 5,135,387 | A | 8/1992 | Martin et al. |
| 5,141,049 | A | 8/1992 | Larsen et al. |
| 5,142,866 | A | 9/1992 | Yanagihara et al. |
| 5,147,111 | A | 9/1992 | Montgomery |
| 5,154,596 | A | 10/1992 | Schwartz et al. |
| 5,183,232 | A | 2/1993 | Gale |
| 5,195,884 | A | 3/1993 | Schwartz et al. |
| 5,197,289 | A | 3/1993 | Glevicky et al. |
| 5,238,395 | A | 8/1993 | Schwartz et al. |
| 5,255,506 | A | 10/1993 | Wilkes et al. |
| 5,265,410 | A | 11/1993 | Hisatome |
| 5,271,905 | A | 12/1993 | Owen et al. |
| 5,275,552 | A | 1/1994 | Schwartz et al. |
| 5,295,350 | A | 3/1994 | Child |
| 5,304,362 | A | 4/1994 | Madsen |
| 5,325,660 | A | 7/1994 | Taniguchi et al. |
| 5,332,036 | A | 7/1994 | Shirley et al. |
| 5,344,307 | A | 9/1994 | Schwartz et al. |
| 5,345,756 | A | 9/1994 | Jahnke et al. |
| 5,355,668 | A | 10/1994 | Weil |
| 5,359,847 | A | 11/1994 | Pillsbury et al. |
| 5,361,586 | A | 11/1994 | McWhirter et al. |
| 5,388,395 | A | 2/1995 | Scharpf et al. |
| 5,394,688 | A | 3/1995 | Amos |
| 5,402,847 | A | 4/1995 | Wilson et al. |
| 5,444,971 | A | 8/1995 | Holenberger |
| 5,457,951 | A | 10/1995 | Johnson |
| 5,458,481 | A | 10/1995 | Surbey et al. |
| 5,468,270 | A | 11/1995 | Borszynski |
| 5,490,378 | A | 2/1996 | Berger et al. |
| 5,542,840 | A | 8/1996 | Surbey et al. |
| 5,566,756 | A | 10/1996 | Chaback et al. |
| 5,572,862 | A | 11/1996 | Mowill |
| 5,581,998 | A | 12/1996 | Craig |
| 5,584,182 | A | 12/1996 | Althaus et al. |
| 5,590,518 | A | 1/1997 | Janes |
| 5,628,182 | A | 5/1997 | Mowill |
| 5,634,329 | A | 6/1997 | Andersson et al. |
| 5,638,675 | A | 6/1997 | Zysman et al. |
| 5,640,840 | A | 6/1997 | Briesch |
| 5,657,631 | A | 8/1997 | Androsov |
| 5,680,764 | A | 10/1997 | Viteri |
| 5,685,158 | A | 11/1997 | Lenahan et al. |
| 5,709,077 | A | 1/1998 | Beichel |
| 5,713,206 | A | 2/1998 | McWhirter et al. |
| 5,715,673 | A | 2/1998 | Beichel |
| 5,724,805 | A | 3/1998 | Golomb et al. |
| 5,725,054 | A | 3/1998 | Shayegi et al. |
| 5,740,786 | A | 4/1998 | Gartner |
| 5,743,079 | A | 4/1998 | Walsh et al. |
| 5,765,363 | A | 6/1998 | Mowill |
| 5,771,867 | A | 6/1998 | Amstutz et al. |
| 5,771,868 | A | 6/1998 | Khair |
| 5,819,540 | A | 10/1998 | Massarani |
| 5,832,712 | A | 11/1998 | Ronning et al. |
| 5,836,164 | A | 11/1998 | Tsukahara et al. |
| 5,839,283 | A | 11/1998 | Dobbeling |
| 5,850,732 | A | 12/1998 | Willis et al. |
| 5,894,720 | A | 4/1999 | Willis et al. |
| 5,901,547 | A | 5/1999 | Smith et al. |
| 5,924,275 | A | 7/1999 | Cohen et al. |
| 5,930,990 | A | 8/1999 | Zachary et al. |
| 5,937,634 | A | 8/1999 | Etheridge et al. |
| 5,950,417 | A | 9/1999 | Robertson, Jr. et al. |
| 5,956,937 | A | 9/1999 | Beichel |
| 5,968,349 | A | 10/1999 | Duyvesteyn et al. |
| 5,974,780 | A | 11/1999 | Santos |
| 5,992,388 | A | 11/1999 | Seger |
| 6,016,658 | A | 1/2000 | Willis et al. |
| 6,032,465 | A | 3/2000 | Regnier |
| 6,035,641 | A | 3/2000 | Lokhandwala |
| 6,062,026 | A | 5/2000 | Woollenweber et al. |
| 6,079,974 | A | 6/2000 | Thompson |
| 6,082,093 | A | 7/2000 | Greenwood et al. |
| 6,089,855 | A | 7/2000 | Becker et al. |
| 6,094,916 | A | 8/2000 | Puri et al. |
| 6,101,983 | A | 8/2000 | Anand et al. |
| 6,148,602 | A | 11/2000 | Demetri |
| 6,170,264 | B1 | 1/2001 | Viteri et al. |
| 6,183,241 | B1 | 2/2001 | Bohn et al. |
| 6,201,029 | B1 | 3/2001 | Waycuilis |
| 6,202,400 | B1 | 3/2001 | Utamura et al. |
| 6,202,442 | B1 | 3/2001 | Brugerolle |
| 6,202,574 | B1 | 3/2001 | Liljedahl et al. |
| 6,209,325 | B1 | 4/2001 | Alkabie |
| 6,216,459 | B1 | 4/2001 | Daudel et al. |
| 6,216,549 | B1 | 4/2001 | Davis et al. |
| 6,230,103 | B1 | 5/2001 | DeCorso et al. |
| 6,237,339 | B1 | 5/2001 | Åsen et al. |
| 6,247,315 | B1 | 6/2001 | Marin et al. |
| 6,247,316 | B1 | 6/2001 | Viteri |
| 6,248,794 | B1 | 6/2001 | Gieskes |
| 6,253,555 | B1 | 7/2001 | Willis |
| 6,256,976 | B1 | 7/2001 | Kataoka et al. |
| 6,256,994 | B1 | 7/2001 | Dillon, IV |

(56) References Cited

U.S. PATENT DOCUMENTS

| | | |
|---|---|---|
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen |
| 6,370,870 B1 | 4/2002 | Kamijo et al. |
| 6,374,591 B1 | 4/2002 | Johnson |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |

(56) References Cited

U.S. PATENT DOCUMENTS

| | | | |
|---|---|---|---|
| 7,237,385 | B2 | 7/2007 | Carrea |
| 7,284,362 | B2 | 10/2007 | Marin et al. |
| 7,299,619 | B2 | 11/2007 | Briesch |
| 7,299,868 | B2 | 11/2007 | Zapadinski |
| 7,302,801 | B2 | 12/2007 | Chen |
| 7,305,817 | B2 | 12/2007 | Blodgett et al. |
| 7,305,831 | B2 | 12/2007 | Carrea et al. |
| 7,313,916 | B2 | 1/2008 | Pellizzari |
| 7,318,317 | B2 | 1/2008 | Carrea |
| 7,343,742 | B2 | 3/2008 | Wimmer et al. |
| 7,353,655 | B2 | 4/2008 | Bolis et al. |
| 7,357,857 | B2 | 4/2008 | Hart et al. |
| 7,363,756 | B2 | 4/2008 | Carrea et al. |
| 7,363,764 | B2 | 4/2008 | Griffin et al. |
| 7,381,393 | B2 | 6/2008 | Lynn |
| 7,401,577 | B2 | 7/2008 | Saucedo et al. |
| 7,410,525 | B1 | 8/2008 | Liu et al. |
| 7,416,137 | B2 | 8/2008 | Hagen et al. |
| 7,434,384 | B2 | 10/2008 | Lord et al. |
| 7,438,744 | B2 | 10/2008 | Beaumont |
| 7,467,942 | B2 | 12/2008 | Carroni et al. |
| 7,468,173 | B2 | 12/2008 | Hughes et al. |
| 7,472,550 | B2 | 1/2009 | Lear, Jr. et al. |
| 7,481,048 | B2 | 1/2009 | Harmon et al. |
| 7,481,275 | B2 | 1/2009 | Olsvik et al. |
| 7,482,500 | B2 | 1/2009 | Johann et al. |
| 7,485,761 | B2 | 2/2009 | Schindler et al. |
| 7,488,857 | B2 | 2/2009 | Johann et al. |
| 7,490,472 | B2 * | 2/2009 | Lynghjem et al. .............. 60/772 |
| 7,491,250 | B2 | 2/2009 | Hershkowitz et al. |
| 7,492,054 | B2 | 2/2009 | Catlin |
| 7,493,769 | B2 | 2/2009 | Jangili |
| 7,498,009 | B2 | 3/2009 | Leach et al. |
| 7,503,178 | B2 | 3/2009 | Bucker et al. |
| 7,503,948 | B2 | 3/2009 | Hershkowitz et al. |
| 7,506,501 | B2 | 3/2009 | Anderson et al. |
| 7,513,099 | B2 | 4/2009 | Nuding et al. |
| 7,513,100 | B2 | 4/2009 | Motter et al. |
| 7,516,626 | B2 | 4/2009 | Brox et al. |
| 7,520,134 | B2 | 4/2009 | Durbin et al. |
| 7,523,603 | B2 | 4/2009 | Hagen et al. |
| 7,536,252 | B1 | 5/2009 | Hibshman, II et al. |
| 7,536,873 | B2 | 5/2009 | Nohlen |
| 7,540,150 | B2 | 6/2009 | Schmid et al. |
| 7,559,977 | B2 | 7/2009 | Fleischer et al. |
| 7,562,519 | B1 | 7/2009 | Harris et al. |
| 7,562,529 | B2 | 7/2009 | Kuspert et al. |
| 7,566,394 | B2 | 7/2009 | Koseoglu |
| 7,574,856 | B2 | 8/2009 | Mak |
| 7,591,866 | B2 | 9/2009 | Bose |
| 7,594,386 | B2 | 9/2009 | Narayanan et al. |
| 7,610,752 | B2 | 11/2009 | Dalla Betta et al. |
| 7,610,759 | B2 | 11/2009 | Yoshida et al. |
| 7,611,681 | B2 | 11/2009 | Kaefer |
| 7,614,352 | B2 | 11/2009 | Anthony et al. |
| 7,618,606 | B2 | 11/2009 | Fan et al. |
| 7,631,493 | B2 | 12/2009 | Shirakawa et al. |
| 7,634,915 | B2 | 12/2009 | Hoffmann et al. |
| 7,635,408 | B2 | 12/2009 | Mak et al. |
| 7,637,093 | B2 | 12/2009 | Rao |
| 7,644,573 | B2 | 1/2010 | Smith |
| 7,650,744 | B2 | 1/2010 | Varatharajan et al. |
| 7,654,320 | B2 | 2/2010 | Payton |
| 7,654,330 | B2 | 2/2010 | Zubrin et al. |
| 7,655,071 | B2 | 2/2010 | De Vreede |
| 7,670,135 | B1 | 3/2010 | Zink et al. |
| 7,673,454 | B2 | 3/2010 | Saito et al. |
| 7,673,685 | B2 | 3/2010 | Huntley Shaw et al. |
| 7,674,443 | B1 | 3/2010 | Davis |
| 7,677,309 | B2 | 3/2010 | Shaw et al. |
| 7,681,394 | B2 | 3/2010 | Haugen |
| 7,682,597 | B2 | 3/2010 | Blumenfeld et al. |
| 7,690,204 | B2 | 4/2010 | Drnevich et al. |
| 7,691,788 | B2 | 4/2010 | Tan et al. |
| 7,695,703 | B2 | 4/2010 | Sobolevskiy et al. |
| 7,717,173 | B2 | 5/2010 | Grott |
| 7,721,543 | B2 | 5/2010 | Massey et al. |
| 7,726,114 | B2 | 6/2010 | Evulet |
| 7,734,408 | B2 | 6/2010 | Shiraki |
| 7,739,864 | B2 | 6/2010 | Finkenrath et al. |
| 7,749,311 | B2 | 7/2010 | Saito et al. |
| 7,752,848 | B2 | 7/2010 | Balan et al. |
| 7,752,850 | B2 | 7/2010 | Laster et al. |
| 7,753,039 | B2 | 7/2010 | Harima et al. |
| 7,753,972 | B2 | 7/2010 | Zubrin et al. |
| 7,762,084 | B2 | 7/2010 | Martis et al. |
| 7,763,163 | B2 | 7/2010 | Koseoglu |
| 7,763,227 | B2 | 7/2010 | Wang |
| 7,765,810 | B2 | 8/2010 | Pfefferle |
| 7,788,897 | B2 | 9/2010 | Campbell et al. |
| 7,789,159 | B1 | 9/2010 | Bader |
| 7,789,658 | B2 | 9/2010 | Towler et al. |
| 7,789,944 | B2 | 9/2010 | Saito et al. |
| 7,793,494 | B2 | 9/2010 | Wirth et al. |
| 7,802,434 | B2 | 9/2010 | Varatharajan et al. |
| 7,815,873 | B2 | 10/2010 | Sankaranarayanan et al. |
| 7,815,892 | B2 | 10/2010 | Hershkowitz et al. |
| 7,819,951 | B2 | 10/2010 | White et al. |
| 7,824,179 | B2 | 11/2010 | Hasegawa et al. |
| 7,827,778 | B2 | 11/2010 | Finkenrath et al. |
| 7,827,794 | B1 | 11/2010 | Pronske et al. |
| 7,841,186 | B2 | 11/2010 | So et al. |
| 7,845,406 | B2 | 12/2010 | Nitschke |
| 7,846,401 | B2 | 12/2010 | Hershkowitz et al. |
| 7,861,511 | B2 | 1/2011 | Chillar et al. |
| 7,874,140 | B2 | 1/2011 | Fan et al. |
| 7,874,350 | B2 | 1/2011 | Pfefferle |
| 7,875,402 | B2 | 1/2011 | Hershkowitz et al. |
| 7,882,692 | B2 | 2/2011 | Pronske et al. |
| 7,886,522 | B2 | 2/2011 | Kammel |
| 7,895,822 | B2 | 3/2011 | Hoffmann et al. |
| 7,896,105 | B2 | 3/2011 | Dupriest |
| 7,906,304 | B2 | 3/2011 | Kohr |
| 7,909,898 | B2 | 3/2011 | White et al. |
| 7,914,749 | B2 | 3/2011 | Carstens et al. |
| 7,914,764 | B2 | 3/2011 | Hershkowitz et al. |
| 7,918,906 | B2 | 4/2011 | Zubrin et al. |
| 7,921,633 | B2 | 4/2011 | Rising |
| 7,922,871 | B2 | 4/2011 | Price et al. |
| 7,926,292 | B2 | 4/2011 | Rabovitser et al. |
| 7,931,712 | B2 | 4/2011 | Zubrin et al. |
| 7,931,731 | B2 | 4/2011 | Van Heeringen et al. |
| 7,931,888 | B2 | 4/2011 | Drnevich et al. |
| 7,934,926 | B2 | 5/2011 | Kornbluth et al. |
| 7,942,003 | B2 | 5/2011 | Baudoin et al. |
| 7,942,008 | B2 | 5/2011 | Joshi et al. |
| 7,943,097 | B2 | 5/2011 | Golden et al. |
| 7,955,403 | B2 | 6/2011 | Ariyapadi et al. |
| 7,966,822 | B2 | 6/2011 | Myers et al. |
| 7,976,803 | B2 | 7/2011 | Hooper et al. |
| 7,980,312 | B1 | 7/2011 | Hill et al. |
| 7,985,399 | B2 | 7/2011 | Drnevich et al. |
| 7,988,750 | B2 | 8/2011 | Lee |
| 8,001,789 | B2 | 8/2011 | Vega et al. |
| 8,029,273 | B2 | 10/2011 | Paschereit et al. |
| 8,036,813 | B2 | 10/2011 | Tonetti et al. |
| 8,038,416 | B2 | 10/2011 | Ono et al. |
| 8,038,746 | B2 | 10/2011 | Clark |
| 8,038,773 | B2 | 10/2011 | Ochs et al. |
| 8,046,986 | B2 | 11/2011 | Chillar et al. |
| 8,047,007 | B2 | 11/2011 | Zubrin et al. |
| 8,051,638 | B2 | 11/2011 | Aljabari et al. |
| 8,061,120 | B2 | 11/2011 | Hwang |
| 8,062,617 | B2 | 11/2011 | Stakhev et al. |
| 8,065,870 | B2 | 11/2011 | Jobson et al. |
| 8,065,874 | B2 | 11/2011 | Fong et al. |
| 8,074,439 | B2 | 12/2011 | Foret |
| 8,080,225 | B2 | 12/2011 | Dickinson et al. |
| 8,083,474 | B2 | 12/2011 | Hashimoto et al. |
| 8,097,230 | B2 | 1/2012 | Mesters et al. |
| 8,101,146 | B2 | 1/2012 | Fedeyko et al. |
| 8,105,559 | B2 | 1/2012 | Melville et al. |
| 8,110,012 | B2 | 2/2012 | Chiu et al. |
| 8,117,825 | B2 | 2/2012 | Griffin et al. |

(56) References Cited

U.S. PATENT DOCUMENTS

| | | |
|---|---|---|
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare |
| 2008/0251234 A1 | 10/2008 | Wilson |
| 2008/0290719 A1 | 11/2008 | Kaminsky et al. |
| 2008/0309087 A1 | 12/2008 | Evulet et al. |
| 2009/0000762 A1 | 1/2009 | Wilson |
| 2009/0025390 A1 | 1/2009 | Christensen et al. |
| 2009/0038247 A1 | 2/2009 | Taylor et al. |
| 2009/0056342 A1* | 3/2009 | Kirzhner ............ 60/772 |
| 2009/0064653 A1 | 3/2009 | Hagen et al. |
| 2009/0071166 A1 | 3/2009 | Hagen et al. |
| 2009/0107141 A1* | 4/2009 | Chillar et al. ............ 60/605.2 |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1* | 11/2009 | Anand ............ B01D 53/8625 290/52 |
| 2009/0301054 A1* | 12/2009 | Simpson et al. ............ 60/39.15 |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0135776 A1* | 6/2010 | Chillar et al. ............ 415/177 |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |

(56) References Cited

U.S. PATENT DOCUMENTS

| | | |
|---|---|---|
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| EP | 0770771 | 5/1997 |
| EP | 2119892 | 11/2009 |
| GB | 776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | PCT/RU2013/000162 | 2/2013 |
| WO | PCT/US13/036020 | 4/2013 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Cho, J. H. et al. (2005) "Marrying LNG and Power Generation," Energy Markets; 10, 8; ABI/INFORM Trade & Industry, 5 pgs.

Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.

Vanda, R. et al. (2007) "Utilizing Air Based Technologies as Heat Source for LNG Vaporization," presented at the 86th Annual convention of the Gas Processors of America (GPA 2007), San Antonio, TX; 13 pgs.

Rosetta, M. J. et al. (2006) "Integrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.

Ahmed, S. et al. (1998) "Catalytic Partial Oxidation Reforming of Hydrocarbon Fuels," *1998 Fuel Cell Seminar*, Nov. 16-19, 1998, 7 pgs.

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.

Comparison of Ion Transport Membranes—Fourth Annual Conference on Carbon Capture and Sequestration DOE/NETL; May 2005.

Ciulia, Vincent. About.com. Auto Repair. How the Engine Works. 2001-2003.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 ( 21) pp. 46.

Ditaranto, M. et al. (2006) "Combustion Instabilities in Sudden Expansion Oxy-Fuel Flames," ScienceDirect, Combustion and Flame, v.146, Jun. 30, 2006, pp. 493-51.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

(56) References Cited

OTHER PUBLICATIONS

Ertesvag, I. S. et al. (2005) "Energy Analysis of a Gas-Turbin Combined-Cycle Power Plant With Precombustion $CO_2$ Capture," Elsivier, 2004, pp. 5-39.

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.

Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.

http://www.turbineinletcooling.org/resources/papers/CTIC_WetCompression_Shepherd_ASMETurboExpo2011.pdf, Jun. 2011.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE* 71749,10 pgs.

Reeves, S. R. (2003) "Enhanced Coalbed Methane Recovery," *SPE* 101466-DL, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.

Zhu, J. et al. (2002) "Recovery of Coalbed Methane by Gas Injection," *SPE* 75255, 15 pgs.

U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

SYSTEM AND METHOD FOR COOLING A GAS TURBINE WITH AN EXHAUST GAS PROVIDED BY THE GAS TURBINE

FIELD OF THE INVENTION

The present invention relates to a system and a method for cooling a gas turbine with an exhaust gas provided by the gas turbine.

BACKGROUND OF THE INVENTION

Modern gas turbines generally operate at extremely high temperatures. In addition, various components of a gas turbine, such as rotor support bearings, generate high temperatures due to friction forces and/or loads placed upon the gas turbine. As a result, high thermal stresses may significantly limit the mechanical life of the gas turbine. Therefore, it is necessary to provide a cooling medium to the gas turbine to prevent overheating and premature failure of the various components. Current methods for cooling and/or sealing the gas turbine include flowing a working fluid, such as compressed air and/or steam, to the various components of the gas turbine. Although current methods are generally effective, there is a growing concern over the long-term effects of Nitrous Oxides (hereinafter NOx), Carbon Dioxide (hereinafter "$CO_2$"), Carbon Monoxide (hereinafter CO) and Sulfur Oxides (hereinafter SOx) emissions on the environment. The allowable levels of NOx and SOx that may be emitted by a gas turbine are heavily regulated. As a result, operators of gas turbines desire methods of effectively cooling the gas turbine while reducing the levels of NOx and SOx emitted.

Exhaust gas recirculation (EGR) generally involves recirculating a portion of the emitted exhaust through an inlet portion of the gas turbine where it is mixed with a working fluid, such as air, prior to combustion. This process facilitates the removal and sequestration of the emitted NOx, SOx, and concentrated $CO_2$ levels, thereby reducing the net emission levels. However, impurities and/or moisture within the exhaust gas prevent utilizing a simple re-circulating loop to reduce the $CO_2$, SOx, and NOx. As a result, turbine fouling, corrosion, and accelerated wear of internal gas turbine components would result from introducing the exhaust gas directly to the gas turbine for combustion and/or for use as a cooling medium. Therefore, the diverted exhaust gas should be treated prior to ingestion into the gas turbine. In addition, significant amounts of condensable vapors exist in the exhaust gas stream. These vapors usually contain a variety of constituents such as water vapor, acids, aldehydes, hydrocarbons, sulfur, and chlorine compounds. Left untreated, these constituents will accelerate corrosion and the fouling of the internal components, if allowed to enter the gas turbine through one or more cooling circuits of the gas turbine.

For the foregoing reasons, there is a need for a system that treats the recirculated exhaust gas stream to minimize the impact of harmful constituents within the exhaust gas stream and that flows the treated recirculated exhaust stream to at least a portion of the gas turbine for cooling and/or sealing.

BRIEF DESCRIPTION OF THE INVENTION

Aspects and advantages of the invention are set forth below in the following description, or may be obvious from the description, or may be learned through practice of the invention.

One embodiment of the present invention is a system for cooling a gas turbine with an exhaust gas provided by the gas turbine. The system generally includes an exhaust gas recirculation system including an exhaust gas scrubber. The exhaust gas recirculation system is disposed downstream from the gas turbine and may receive at least a portion of the exhaust gas provided by the gas turbine. The system may also include a moisture separator located downstream from the exhaust gas recirculation system, and a cooling circuit configured to connect to one or more cooling circuit inlets. The one or more cooling circuit inlets may provide fluid communication between the cooling circuit and the gas turbine.

Another embodiment of the present invention is a gas turbine. The gas turbine generally includes a compressor and a combustion section downstream from the compressor. A turbine may be positioned downstream from the combustion section, where the turbine may provide an exhaust gas stream to an exhaust gas recirculation system positioned downstream from the turbine. The exhaust gas recirculation system may receive at least a portion of the exhaust gas stream from the turbine. A moisture separator may be located downstream from the exhaust gas recirculation system. The gas turbine may further include a cooling circuit downstream from the moisture separator, and one or more cooling circuit inlets downstream from the cooling circuit, where the one or more cooling circuit inlets may provide fluid communication between the cooling circuit and at least a portion of the gas turbine.

The present invention may also include a method for cooling the gas turbine with the exhaust stream flowing from the gas turbine. The method may include flowing the exhaust stream into an exhaust gas recirculation system, treating the exhaust gas stream flowing through the exhaust gas recirculation system, flowing the exhaust stream from the exhaust gas recirculation system through a moisture separator, flowing the exhaust stream from the moisture separator into a cooling circuit, and flowing the exhaust stream from the cooling circuit into at least one cooling circuit inlet of the gas turbine.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention; one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like merely describe the configuration shown in the Figures. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Indeed, the element or elements of an embodiment of the present invention may be oriented in any direction and the terminology, therefore, should be understood as encompassing such variations unless specified otherwise.

The present invention has the technical effect of reducing the levels of NOx, SOx, concentrated $CO_2$, moisture content, and other harmful constituents, all of which may be within a portion of the exhaust of a gas turbine, and utilizing the exhaust stream as a cooling medium to be supplied back into the gas turbine. As a result, the gas turbine may generally operate substantially within emissions guidelines without largely affecting reliability and/or availability of the gas turbine.

Various embodiments of the present invention include a system and method for cooling a gas turbine with a recirculated turbine exhaust stream. The recirculated exhaust stream may be used for cooling and/or sealing various portions of the gas turbine. The system generally includes an exhaust gas recirculation system configured to receive at least a portion of the exhaust gas stream provided by the turbine, a moisture separator downstream from the exhaust gas recirculation system and one or more cooling circuits downstream from the moisture separator. The one or more cooling circuits may be configured to connect to the gas turbine at one or more cooling circuit inlet connections. In particular embodiments, the one or more cooling circuit inlets may provide fluid communication between the system and one or more shaft bearing assemblies, to an exhaust frame, to the turbine, to a bearing tunnel or any combination thereof. A cooling circuit may provide cooling fluid and/or sealing fluid.

In operation, the turbine produces an exhaust stream of combustion byproducts where at least a portion of the exhaust stream is received by the exhaust gas recirculation system. This portion of the exhaust gas stream is herein referred to as the "recirculating exhaust stream". The recirculating exhaust stream may be treated as it flows through the exhaust gas recirculation system. For example, but not limiting of, the recirculating exhaust stream may be cooled and/or scrubbed of CO, $CO_2$, SOx, or other contaminants which may be corrosive to the gas turbine. The treated recirculating exhaust stream may then flow downstream to the moisture separator where moisture carried over from the exhaust gas recirculation system may be removed from the treated recirculating exhaust stream. In particular embodiments, the recirculating exhaust stream may flow downstream from the moisture separator and into a compressor where the pressure of the recirculating exhaust stream may be increased. The treated recirculating exhaust stream may then flow into the one or more cooling circuits where it may be reintroduced to the gas turbine through the one or more cooling circuit inlets. The present invention may be applied to a variety of turbo-machines that produce a gaseous fluid, such as, but not limiting of, a heavy duty gas turbine; an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

Figure 1:
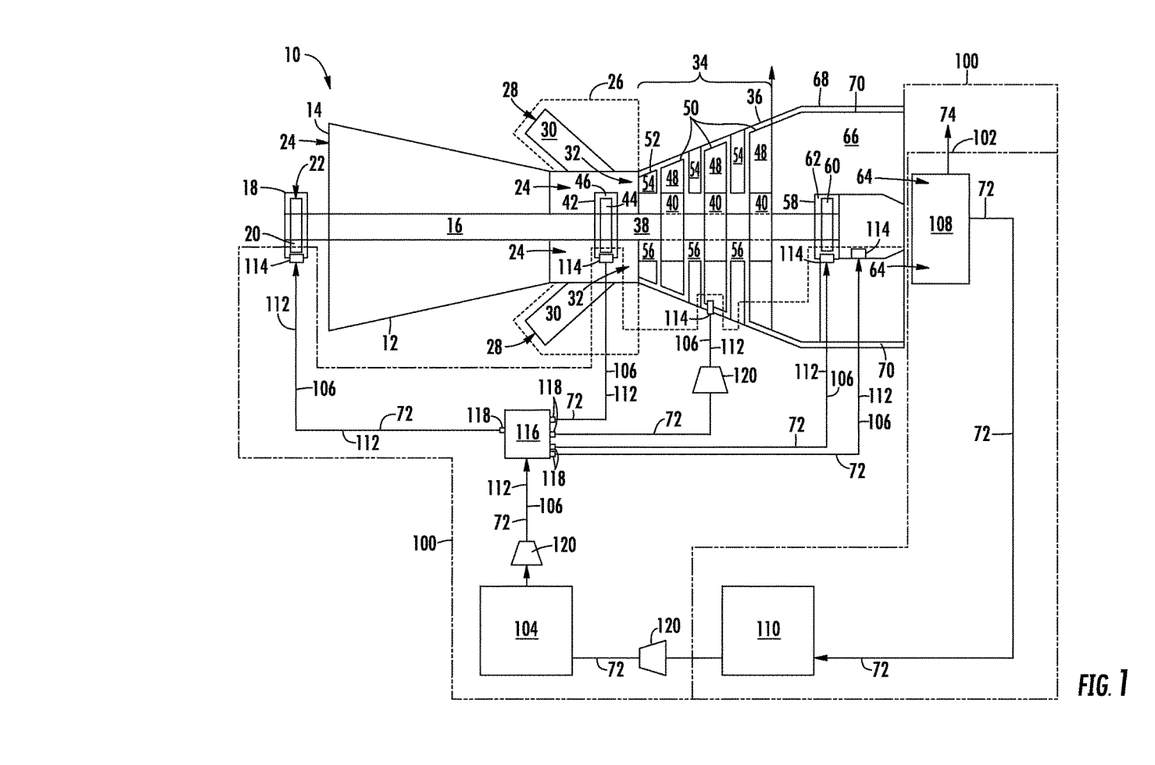
FIG. 1 is a schematic illustration of a gas turbine and a system for cooling a gas turbine according to at least one embodiment of the present invention.

FIG. 1 is a schematic illustrating a system for cooling a gas turbine 10 with a recirculated turbine exhaust stream in accordance with at least one embodiment of the present invention. As shown, a gas turbine 10 generally includes a compressor 12 having an inlet 14 at the upstream end of the compressor 12. A compressor shaft 16 extends axially through at least a portion of the compressor 12. A compressor bearing assembly 18 may at least partially support at least a portion of the compressor shaft 16. The compressor bearing assembly 18, also known in the industry as the "N1 bearing assembly" or as the "forward bearing assembly" generally includes one or more bearings designed to support the weight of the compressor shaft 16, to accommodate for thermal growth and/or contraction of the compressor shaft 16, and to allow for the high rotational speeds of the compressor shaft 16 during operation of the gas turbine 10. For example, but not limiting of, the compressor bearing assembly 18 may include a journal bearing, a loaded thrust bearing, an unloaded thrust bearing or any combination thereof. The compressor bearing assembly 18 may include an inner housing 20 that is at least partially sealed to contain pressurized oil that reduces friction and heat within the compressor bearing assembly 18. The compressor bearing assembly 18 may also include one or more fluid circuits 22 that at least partially surround the inner housing 20 and provide a flow path for a cooling and/or a sealing medium such as, but not limiting of, a recirculated exhaust gas to flow at least partially through the compressor bearing assembly 18. It should be known to one of ordinary skill in the art that the gas turbine 10 may include multiple bearing assemblies which may be configured as described above in relation to the compressor bearing assembly 18. In operation of the gas turbine 10, a working fluid 24 such as, but not limiting of, air flows into the compressor inlet 14, is compressed by the compressor 12 and is then discharged to a combustion system 26. A fuel 28 such as, but not limiting of, natural gas is mixed with at least a portion of the compressed working fluid 24 to form a combustible mixture 30. The combustible mixture 30 is ignited and burned within the combustion system 26 to provide high-energy combustion gases 32 which flow into a turbine 34.

The turbine 34 may be at least partially surrounded by a turbine casing 36. A rotor shaft 38 may extend at least partially through the turbine 34 and may support one or more rotor disks 40 that extend generally radially outward from the rotor shaft 38. In particular embodiments, the rotor shaft 38 and the compressor shaft 16 may be at least partially coupled by a mid-span bearing assembly 42. The mid-span bearing assembly 42 generally includes one or more bearings designed to support the weight of the compressor shaft 16 and/or the rotor shaft 38, to accommodate for thermal growth and/or contraction of the compressor shaft 16 and/or the rotor shaft 38 and to allow for the high rotational speeds of the compressor shaft 16 and/or the rotor shaft 38 during operation of the gas turbine 10. For example but not limiting of, the mid-span bearing assembly 42 may include a journal bearing, a loaded thrust bearing, an unloaded thrust bearing or any combination thereof. In particular gas turbine 10 configurations, a single shaft (not illustrated) may extend through the gas turbine 10, thereby replacing the compressor shaft 16 and the rotor shaft 38. In this case, the mid-span bearing assembly 42 may provide support to the single shaft at a point generally downstream from the compressor 12. The mid-span bearing assembly 42 may include an inner housing 44 that is at least partially sealed to contain pressurized oil that reduces friction and heat within the mid-span bearing assembly 42. The mid-span bearing assembly 42 may also include one or more fluid circuits 46 that at least partially surround the inner housing 44 and that provides a flow path for a cooling and/or a sealing medium such as, but not limiting of, a recirculating exhaust gas, to flow at least partially through the mid-span bearing assembly 42.

Each of the one or more rotor disks 40 may support a plurality of turbine blades 48 attached circumferentially around the rotor disks 40. Each rotor disk 40 and corresponding plurality of turbine blades 48 may form a stage 50 of the turbine blades 48. In addition, the turbine 34 may include one or more stages 52 of stationary vanes 54 that alternate between the one or more stages 50 of turbine blades 48. The turbine 34 may also include one or more fluid passages 56 formed between the rotor disks 40, through the stationary vanes 54, through the turbine blades 48 or any combination thereof. A rotor shaft bearing assembly 58 may provide support to an aft end of the rotor shaft 38. The rotor shaft bearing assembly 58, also known in the industry as the "N2 bearing assembly" or the "aft bearing assembly" generally includes one or more bearings designed to support the weight of the rotor shaft 38, to accommodate for thermal growth and/or contraction of the rotor shaft 38 and to allow for the high rotational speeds of the rotor shaft 38 during operation of the gas turbine 10. For example but not limiting of, the rotor shaft bearing assembly 58 may include a journal bearing, a loaded thrust bearing, an unloaded thrust bearing or any combination thereof. The rotor shaft bearing assembly 58 may include an inner housing 60 that is at least partially sealed to contain pressurized oil. The pressurized oil may reduce friction and heat within the rotor shaft bearing assembly 58. The rotor shaft bearing assembly 58 may also include one or more fluid circuits 62 that at least partially surround the inner housing 60 and that provide a flow path for a cooling and/or a sealing medium such as, but not limiting of, a recirculated exhaust gas, to flow at least partially through the rotor shaft bearing assembly 58.

In the turbine 34, a portion of the energy of the hot gases is imparted to the one or more turbine blade stages 50 causing the rotor shaft 38 to turn, thereby converting the energy from the hot gases into mechanical work. At least a portion of the mechanical work produced may be used to drive the compressor 12 through the compressor shaft 16, with the remainder being available for driving a load, such as a generator (not illustrated). As the hot gases exit the turbine 34, an exhaust stream 64 flows downstream to an exhaust duct 66 that is at least partially supported and/or formed by an exhaust frame 68. As a result, the hot gases may heat the exhaust duct 66. Therefore, one or more fluid circuits 70 may extend at least partially through the exhaust frame 68 to provide a flow path for a cooling and/or a sealing medium such as, but not limiting of, a recirculated exhaust gas, to flow through at least a portion of the exhaust frame 68. As the exhaust stream 64 exits the exhaust duct 66, at least a portion of the exhaust stream 64, herein referred to as the "recirculating exhaust stream 72", may be diverted to the system for cooling the gas turbine, herein referred to as "the system 100".

The system 100 generally includes an exhaust gas recirculation system 102 generally downstream from the turbine 34, a moisture separator 104 downstream from the exhaust gas recirculation system 102 and one or more cooling circuits 106 downstream from the moisture separator 104. The exhaust gas recirculation system 102, as illustrated in FIG. 1, may comprise at least one flow modulation device 108 and at least one scrubber 110. The at least one flow modulation device 108 may apportion the total exhaust stream 64 between a non-recirculated exhaust stream 74 and the recirculating exhaust stream 72. The at least one flow modulation device 108 may be of any size and fabricated of any material capable of withstanding the physical properties, such as, but not limiting of, a flow rate of about 10000 Lb/hr to about 50000000 Lb/hr and a temperature of about 100 F to about 1500 F. The recirculating exhaust stream 72 may flow downstream of the at least one flow modulation device 108 to an inlet portion of the at least one scrubber 110.

A scrubber system (hereinafter "scrubber 110") is generally considered as an air pollution control device that may remove particulates and/or other emissions from industrial exhaust streams. A scrubber may use a "scrubbing process", or the like, generally involving a liquid or dry substance to "scrub" unwanted pollutants from a gas stream. In particular embodiments of the present invention, the at least one scrubber 110 may perform various functions after receiving the recirculating exhaust stream 72. For example, but not limiting of, the at least one scrubber 110 may lower the temperature of the recirculating exhaust stream 72 to a range of about 60 degrees Fahrenheit to about 200 degrees Fahrenheit. The at least one scrubber 110 may also remove at least a portion of a plurality of constituents (not illustrated) within the recirculating exhaust stream 72, from a first level to a second level. The constituents may include for example, but not limiting of, water vapor, acids, aldehydes, hydrocarbons, or combinations thereof. In alternate embodiments, the scrubber may be disposed upstream from the flow modulation device 108. In this manner, the entire exhaust gas stream 64 flowing from the turbine exhaust duct 66 may flow into the scrubber 110 and then into the flow modulation device 108 where it can be portioned as needed.

Figure 2:
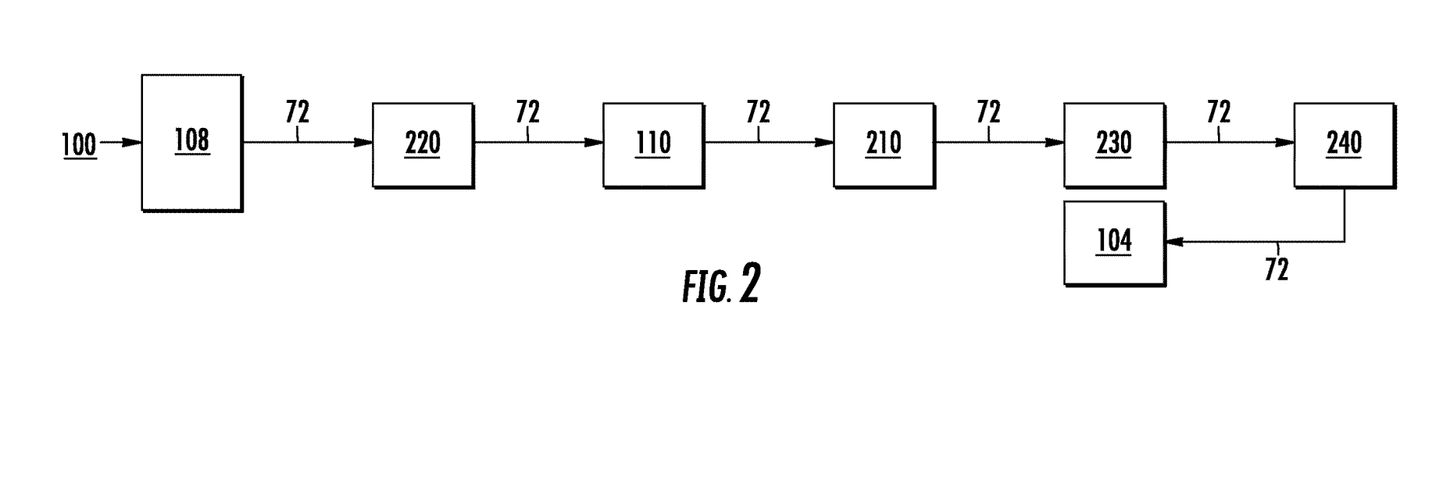
FIG. 2 is a schematic illustration of a portion of the system as shown in FIG. 1 according to at least one embodiment of the present invention.

Although a generally basic exhaust gas recirculation system 102 is described and illustrated in FIG. 1, it should be known by one of ordinary skill in the art that the exhaust recirculation system 102 may have a variety of components in any sequential order which may cool and/or otherwise treat the recirculating exhaust stream 72 before flowing the recirculating exhaust stream 72 to the moisture separator 104. For example, but not limiting of, as shown in FIG. 2, the exhaust gas recirculation system 102 described above may further include any one or any combination in any sequential order of the following components: at least one downstream heat exchanger 210 located downstream of the at least one scrubber 110 and upstream of the moisture separator 104, at least one upstream heat exchanger 220 located upstream of the at least one scrubber 110, at least one injector 230, and/or at least one wet electrostatic precipitator 240. In addition or in the alternative, the exhaust gas recirculation system 102 may also include a heat recovery system (not illustrated) that receives at least a portion of the recirculating exhaust stream 72 and/or the non-recirculating exhaust stream 74 to generate steam.

In particular embodiments, as shown in FIG. 1, after the scrubbing process the recirculating exhaust stream 72 may flow downstream to the moisture separator 104. The moisture separator 104 may include any type of device known in the art for removing at least a portion of liquid droplets, moisture and/or humidity from a fluid stream. For example, but not limiting of, the moisture separator 104 may be a panel type, a single stage, a multi-stage, a cellular drift type, a coalescer, a de-mister, a desiccant, triethylene glycol, or any combination thereof. The moisture separator 104 may at least partially dry the recirculating exhaust stream 72 by removing droplets of liquid, such as water, oil or other forms of moisture from the recirculating exhaust stream 72 that may have carried over from the scrubbing process.

After the recirculating exhaust stream 72 is at least partially dried in the moisture separator 104, the recirculating exhaust stream 72 may then flow downstream to the one or more cooling circuits 106. The one or more cooling circuits 106 may generally include one or more fluid conduits 112. The one or more fluid conduits 112 may be configured to connect to the gas turbine 10 at one or more cooling circuit inlets 114 disposed at various locations of the gas turbine 10. For example, but not limiting of, the one or more fluid conduits 112 may include one or more fluid couplings (not illustrated) or fluid fittings (not illustrated) that are complementary to one or more fluid couplings or fluid fittings of the one or more cooling circuit inlets 114. In addition or in the alternative, the one or more fluid conduits 112 may be bolted, welded, screwed or connected to the cooling circuit inlets 114 in any manner known in the art for making a fluid connection between a fluid source and a fluid receiver, such as, but not limiting of, the one or more cooling circuits 112 and the one or more cooling circuit inlets 114.

In particular embodiments, the one or more cooling circuits 106 may include a flow distribution header 116 that is in fluid communication with the moisture separator 104. The flow distribution header 116 may include one or more outlets 118. The one or more fluid conduits 112 may be connected to the one or more outlets 118. The flow distribution header 116 may also include one or more valves (not illustrated) and/or controls (not illustrated) for directing and/or diverting the recirculating exhaust stream 72 to or from the one or more outlets 118. In this manner, the system 100 may flow the recirculating exhaust stream 72 to one or to multiple of the one more fluid conduits 112 during operation of the gas turbine 10. As a result, when connected to the one or more cooling circuit inlets 114, the system may supply the recirculating exhaust stream 72 to a single cooling circuit inlet 114 or to multiple cooling circuit inlets 114 as necessary to cool various portions of the gas turbine individually or simultaneously.

In addition or in the alternative, at least one of the one or more cooling circuits 106 may include one or more compressors 120 upstream and/or downstream from the moisture separator 104. The one or more compressors 120 may include any compressor that can compress the recirculating exhaust stream 72, thereby raising the pressure of the recirculating exhaust stream 72. For example, but not limiting of, the one or more compressors may include an axial compressor, a rotary compressor or a blower. In this manner, the pressure of the recirculating exhaust stream 72 may be increased so as to flow the recirculating exhaust stream 72 through the system 100 and into the one or more cooling circuit inlets 114.

In particular embodiments of the present invention, the one or more cooling circuit inlets 114 of the gas turbine 10 may provide fluid communication to one or more components and/or areas of the gas turbine 10. For example, but not limiting of, the one or more cooling circuit inlets 114 may provide fluid communication between the one or more cooling circuits 106 to one or any combination of the following; the compressor shaft bearing assembly 18, the mid-span bearing assembly 42, the rotor shaft bearing assembly 58, the one or more fluid passages 56 extending through the turbine 34 or the one or more fluid passages 70 extending at least partially through exhaust frame 68. In addition or in the alternative, the recirculated exhaust gas may flow into the combustor for additional cooling. In this manner, the recirculating exhaust stream may flow from the turbine exhaust duct 66, through the system 100 and through one or more of the cooling circuit inlets 114 in order to provide an effective and less corrosive cooling and/or sealing medium to the gas turbine 10.

One of ordinary skill in the art will readily appreciate from the teachings herein that the various embodiments shown and described with respect to FIGS. 1-2 may also provide a method for cooling the gas turbine 10 with at least a portion of the exhaust stream 64 flowing from the gas turbine 10. The method may include flowing the exhaust stream 64 into the exhaust gas recirculation system 102 and treating the exhaust gas stream 72 flowing through the exhaust gas recirculation system 102. For example, but not limiting of, "treating" may include lowering the temperature and/or scrubbing the exhaust stream 72 of SOx and other undesirable constituents. The method may also include flowing the exhaust stream 72 from the exhaust gas recirculation system 102 through a moisture separator 104 where liquid droplets may be removed from the exhaust stream 72. The method further includes flowing the exhaust stream 72 from the moisture separator 104 into a cooling circuit 106, and then flowing the exhaust stream 72 from the cooling circuit 106 into at least one of the one or more cooling circuit inlets 114 of the gas turbine 10. In addition, the method may further include flowing the exhaust stream 72 through the one or more cooling circuit inlets 114 and into the one or more bearing assemblies such as, but not limiting of, the compressor shaft bearing assembly 18, the mid-span bearing assembly 42, the rotor shaft bearing assembly 58 or any combination thereof. The method may also include flowing the exhaust stream 72 from the moisture separator 104 through the cooling circuit 106 compressor 120 at a first pressure and flowing the exhaust stream 72 from the cooling circuit 106 compressor 120 at a second pressure higher than the first pressure, into the one or more cooling circuit inlets 114.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A system, comprising:
an exhaust gas path configured to receive at least a portion of an exhaust gas provided by a gas turbine;

an exhaust gas scrubber fluidly coupled to the exhaust gas path;
a moisture separator fluidly coupled to the exhaust gas path; and
a cooling circuit fluidly coupled to the exhaust gas path downstream from the exhaust gas scrubber and the moisture separator, wherein the cooling circuit is configured to fluidly couple to a plurality of cooling paths through the gas turbine, wherein the plurality of cooling paths is separate from a working fluid path through the gas turbine, wherein the cooling circuit comprises a flow distribution header and a compressor fluidly coupled to the flow distribution header, wherein the compressor is separate from the flow distribution header, and the flow distribution header is configured to distribute the exhaust gas to the plurality of cooling paths through the gas turbine, and wherein the flow distribution header comprises at least one setting that enables simultaneous distribution of the exhaust gas to at least two cooling paths of the plurality of cooling paths.

2. The system of claim 1, comprising an electrostatic precipitator, or an injector, or a combination thereof, fluidly coupled to the exhaust gas path.

3. The system of claim 1, comprising a first heat exchanger fluidly coupled to the exhaust gas path upstream from the exhaust gas scrubber, or a second heat exchanger fluidly coupled to the exhaust gas path downstream from the exhaust gas scrubber, or a combination of the first heat exchanger and the second heat exchanger.

4. The system of claim 1, wherein the plurality of cooling paths is disposed between rotor disks, through stationary vanes, through turbine blades, or any combination thereof.

5. The system of claim 1, wherein the plurality of cooling paths is fluidly coupled to a bearing assembly.

6. The system of claim 5, wherein the bearing assembly comprises a compressor bearing assembly, or a turbine bearing assembly, or an intermediate bearing assembly disposed between the compressor and turbine bearing assemblies.

7. The system of claim 1, wherein the plurality of cooling paths is disposed through an exhaust frame, and the exhaust frame is disposed about an exhaust duct.

8. The system of claim 1, comprising the gas turbine having a compressor, a combustor, and a turbine.

9. The system of claim 8, comprising an exhaust gas recirculation (EGR) system fluidly coupled to the exhaust gas path.

10. The system of claim 9, wherein the EGR system is configured to recirculate a first portion of the exhaust gas into an intake of the compressor of the gas turbine, the cooling circuit is configured to route a second portion of the exhaust gas into the plurality of cooling paths through the gas turbine, and the plurality of cooling paths is separate from the working fluid path through the compressor, the combustor, and the turbine of the gas turbine.

11. A system, comprising:
a gas turbine comprising a working fluid path through a compressor, a combustor, and a turbine, wherein the gas turbine comprises two or more cooling paths outside of the working fluid path;
an exhaust gas treatment system configured to remove one or more contaminants from an exhaust gas of combustion products to produce a treated exhaust gas; and
a cooling circuit configured to route at least a first portion of the treated exhaust gas toward the two or more cooling paths;
a flow distribution header coupled to the cooling circuit and to the two or more cooling paths, wherein the flow distribution header is configured to receive the first portion of the treated exhaust gas from the cooling circuit, wherein the flow distribution header is configured to route the first portion of the treated exhaust gas to the two or more cooling paths, and wherein the flow distribution header comprises at least a first setting configured to enable simultaneous distribution of the first portion of the treated exhaust gas to at least two cooling paths of the two or more cooling paths; and
an additional compressor fluidly coupled with the flow distribution header, separate from the flow distribution header, disposed upstream of the flow distribution header, and configured to supply the exhaust gas to the flow distribution header after compressing the exhaust gas in the additional compressor.

12. The system of claim 11, wherein the system is configured to route at least a second portion of the treated exhaust gas to an intake into the compressor.

13. The system of claim 11, comprising an exhaust gas recirculation (EGR) system having an exhaust flow path from the turbine to the compressor.

14. The system of claim 11, wherein the two or more cooling paths are disposed between rotor disks, through stationary vanes, through turbine blades, or any combination thereof.

15. The system of claim 11, wherein the two or more cooling paths are disposed through an exhaust frame, and the exhaust frame is disposed about an exhaust duct.

16. The system of claim 11, wherein the exhaust gas treatment system comprises a scrubber, a moisture separator, or a combination thereof.

17. The system of claim 11, wherein the one or more contaminants comprise materials that are corrosive to the gas turbine.

18. A method, comprising:
flowing one or more working fluids through a working fluid path through a compressor, a combustor, and a turbine of a gas turbine;
outputting an exhaust gas of combustion products from the gas turbine;
treating the exhaust gas to remove one or more contaminants from the exhaust gas to produce a treated exhaust gas;
routing at least a first portion of the treated exhaust gas toward two or more cooling paths through the gas turbine outside of the working fluid path;
receiving, via a flow distribution header, the first portion of the treated exhaust gas at a first pressure and simultaneously distributing the first portion of the treated exhaust gas to the two or more cooling paths at a second pressure, wherein the second pressure is less than or equal to the first pressure; and
cooling at least one of a bearing assembly, a turbine vane, a turbine blade, a rotor disk, or an exhaust frame via a flow of the first portion of the treated exhaust gas through the two or more cooling paths.

19. The method of claim 18, comprising routing at least a second portion of the treated exhaust gas to an intake into the compressor.

20. The method of claim 18, wherein treating comprises removing moisture and corrosive materials from the exhaust gas to produce the treated exhaust gas.

* * * * *